Sept. 25, 1934.  O. THOMPSON  1,974,934
MOTOR STRUCTURE
Filed March 14, 1932  4 Sheets-Sheet 1

Olof Thompson
Inventor

By Darby & Darby Atty

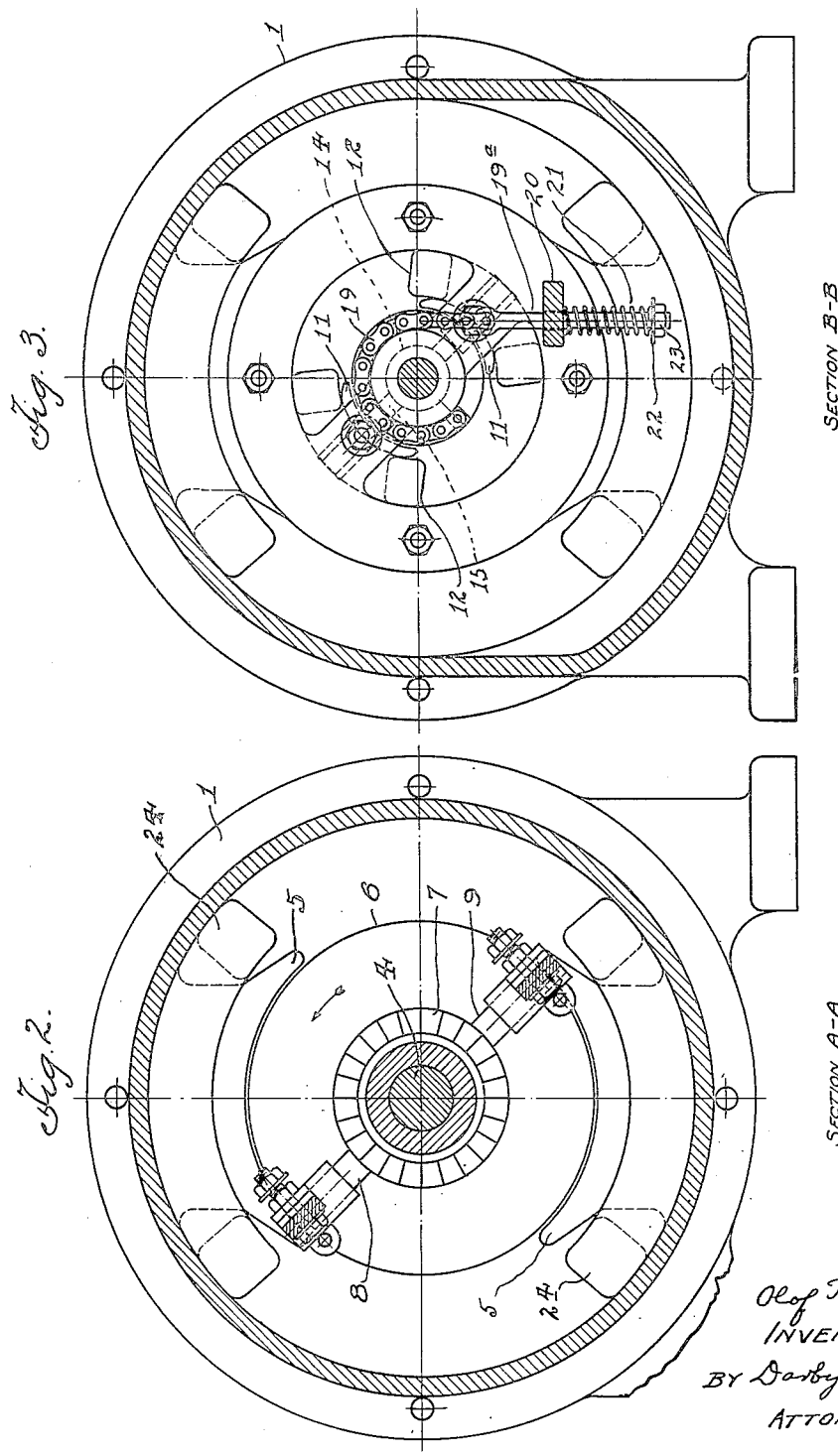

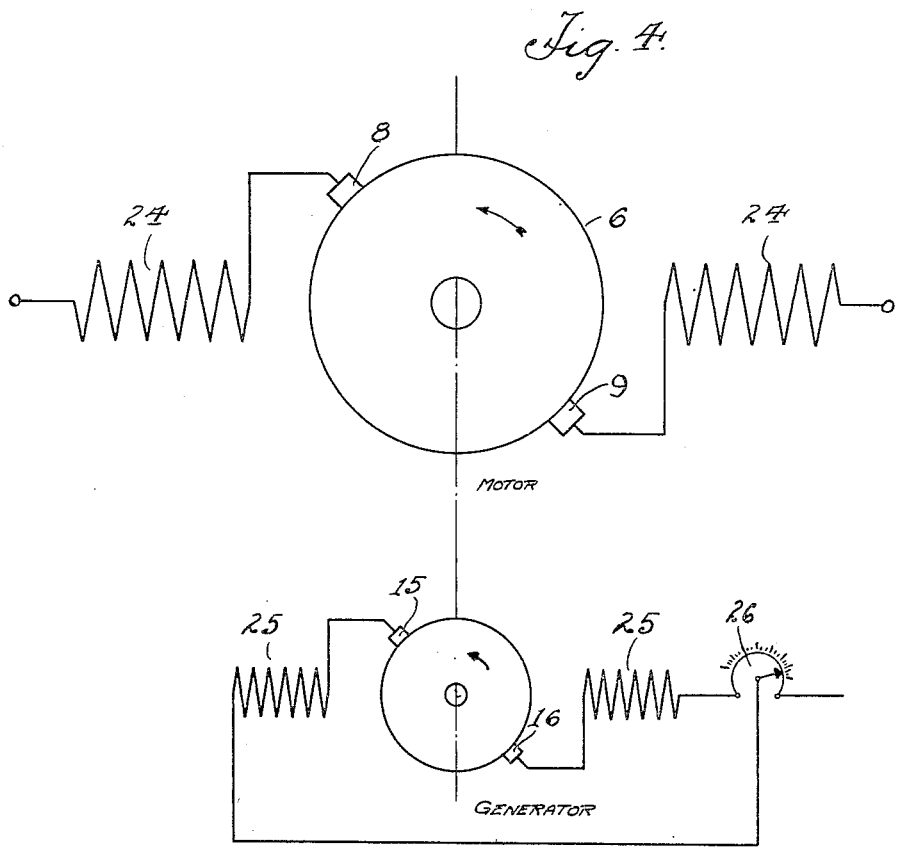

Olof Thompson
INVENTOR

BY Darby & Darby
ATTORNEYS

Patented Sept. 25, 1934

1,974,934

UNITED STATES PATENT OFFICE 1,974,934

MOTOR STRUCTURE

Olof Thompson, Long Island City, N. Y., assignor to Takamine Corporation, Long Island City, N. Y., a corporation of New York Application March 14, 1932, Serial No. 598,630

8 Claims. (Cl. 171—221)

This invention relates to electric motors, and with particularity to a motor whose speed may be adjusted to any desired value accurately and expeditiously.

It is a well known fact that series motors either of the A. C. or D. C. type vary their speed in accordance with the load.

In certain fields therefore, this type of motor is impractical, notwithstanding its desirable features in other respects. Particularly is this true of the elevator or similar arts where the load may vary between very wide limits. For this reason series type motors have never found favor in the elevator art, for example, because of their load-speed characteristics.

Accordingly it is one of the principal objects of the present invention to provide a series motor which possesses its inherent variable speed characteristic, but which is provided with means for adjusting this speed to any fixed value.

Another object of the invention is to provide a series type motor which is capable of running at substantially constant speed independently of the load.

Another object of the invention is to provide a series type motor together with means for enabling the speed of the motor to be adjusted to any desired fixed value while the motor is running substantially independently of the load.

A feature of the invention relates to a motor of the commutator type having means for automatically adjusting the position of the motor supply brushes to maintain the motor speed constant, or at any desired fixed value.

A feature of the invention relates to a series motor of the commutator type together with means for automatically maintaining the motor speed constant and for reversing the direction of rotation of the motor.

Another feature of the invention relates to a series motor together with means for remotely controlling and fixing the motor speed substantially independently of the load.

Another feature of the invention relates to the combination of a series motor in conjunction with a speed adjusting device which may be calibrated directly in speeds at which the motor is to be run substantially independently of its load.

A further feature of the invention relates to a novel automatic mechanism for adjusting or moving the brushes of a commutator motor.

While the present invention is described in connection with one typical motor structure, it will be understood that the invention is not limited thereto, but is capable of application to any motor of the commutator or brush controlled type. Amongst such motors may be mentioned the simple D. C. series motor, the A. C. series motor, the polyphase D. C. or A. C. motors, and repulsion motors of the alternating current type. Indeed, the invention is capable of application to any motor which has an inherent variable speed-load characteristic, and which is capable of having its speed varied by adjustment of the brushes, or phase relation between the armature and field fluxes.

Accordingly, in the drawings Fig. 1 represents a sectional plan view of a motor structure according to the invention;

Fig. 2 is a sectional view of the structure of Fig. 1 along the line A—A thereof;

Fig. 3 is a sectional view of the structure of Fig. 1, taken along the line B—B thereof;

Fig. 4 is a schematic diagram of the circuit connections to the motor and brush adjusting device;

Figure 1:
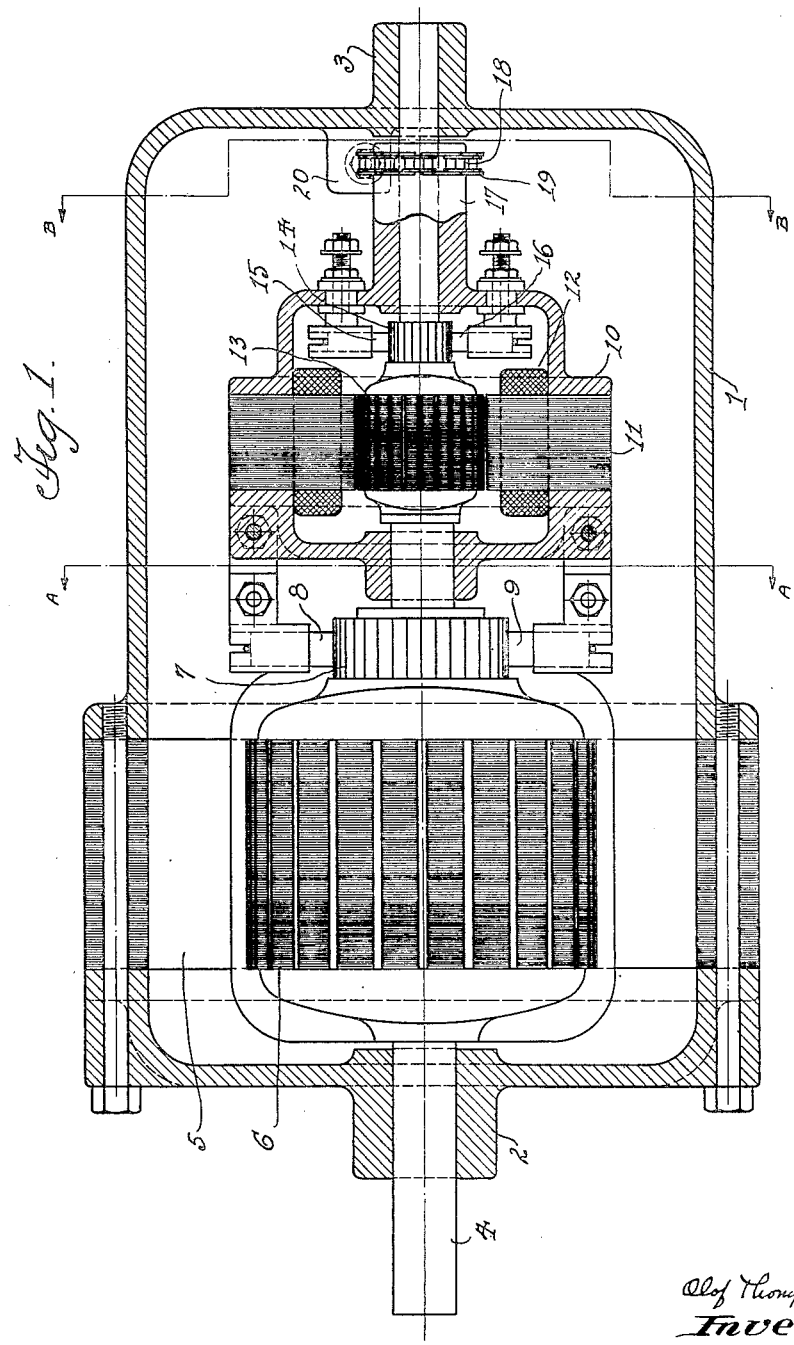

Referring more particularly to Fig. 1, the numeral 1 represents an enclosing housing of any suitable type having journal bearings 2 and 3 in opposite ends thereof to receive the main shaft 4 of the motor. The field structure 5 and the motor may be of any suitable type well known in the art. Similarly the armature 6 of the motor may be of any well known motor armature construction. Inasmuch as the invention is eminently useful in series motors, it will be understood that the field 5 and the armature 6 will be designed in accordance with standard series motor practice, this being true whether the motor is designed to run on alternating current or direct current. For purposes of simplicity it will be assumed that the motor is of the single phase alternating current type, or of the simple D. C. series type. In accordance with standard practice, the armature 6 is provided with a suitable commutator 7, and a pair of brushes 8, 9. The brushes 8, 9 are carried by a rotatable frame 10, to which they are insulatingly fastened in any suitable manner. The frame 10 serves as a housing for the brush adjusting generator and is mounted for rotation on the shaft 4. The housing 10 carries a suitable field structure 11 having the usual field winding 12 therefor. Cooperating with the field 11 is an armature 13 of any suitable construction. The armature 13 is keyed or otherwise fastened to the shaft 4, so as to rotate in unison therewith. Armature 13 is also provided with a suitable commutator 14 and cooperating brushes 15, 16.

The armature 13 and the field 11 are designed to act as a small generator, preferably of the series type, although this is not absolutely necessary. From the foregoing description it will be noted that the housing 10, together with the field structure 11 is freely rotatable around the shaft 4, while the armature 13 is driven directly by the said shaft. Consequently when the field 11 is not excited the brushes 8 and 9 assume a definite normal position. This normal position may be chosen in accordance with the normal speed at which the motor and shaft 4 are to run. For the purpose, however, of adjusting the normal position of the brushes 8 and 9, the housing 10 is provided with a reduced portion 17 which has fixed thereto a sprocket 18. Passing around the sprocket 18 is a suitable chain 19 having one end rigidly attached to the sprocket and the other end attached to a rod 19ª. The rod 19ª is supported for vertical adjustment in the bracket 20. Surrounding the rod 19ª is a spring 21 whose upper end seats against the brackets 20 and the lower end seats against the washer 22. By means of the nut 23 the tension on the spring 21 may be adjusted and consequently the position of the rod 19ª and the brushes 8 and 9 may be accurately adjusted to normal position. The circuit connections are preferably such that when the field 11 and the armature 13 are excited the brushes 8 and 9 tend to move in the same direction as the rotation of the armature 6.

Referring to Fig. 4, there is a shown a schematic diagram of the circuits for the motor and brush-control generator, the parts in this figure corresponding to those of Figs. 1 to 3 are designated by the same numerals. As will be obvious from an inspection of Fig. 4, the motor is connected to run as a straight series motor with the armature current in series with the current through the field windings 24. The brush-control generator is electrically isolated from the motor and as will be obvious from Fig. 4, it is connected in circuit to run as a series generator with the armature in series with the field windings 25. For the purpose of controlling the current generated by the brush-control generator, there is provided a rheostat 26 which may be connected in series with the armature and field, although any other disposition of this rheostat may be employed. As a matter of fact, any well known means for controlling the current generated may be employed. It has been found that the rheostat 26 or other speed adjusting devices may be calibrated directly in terms of the speed of the motor.

The functioning of the above described apparatus is substantially as follows: It is a well known fact in any generator the field structure tends to follow the armature. Of course, in ordinary generators the field structure is fixed and there is no perceptible movement. However, in the arrangement described above the field structure for the brush-control generator is rotatably mounted on the shaft 4, and consequently as the armature 13 rotates it tends to carry with it the associated field structure, and consequently the brushes 8 and 9. Preferably the circuit arrangements are such that the generator field in moving, moves the motor brushes 8 and 9 in the same direction as the motor rotation, thus decreasing the load on the brush-control generator, and expediting the movement of the brushes. By means of the current varying device 26 the amplitude of the current generated by the brush-control generator may be very accurately adjusted, and any given adjustment of the device 26 fixes and determines the speed of the motor substantially independently of its load. For example, assume that the motor is running at a speed of 100 R. P. M., and that this is the selected normal running speed, and that the brushes 8 and 9 are adjusted to the proper position for this speed by means of the mechanism 18 to 23 inclusive. Under this condition, therefore, the member 26 is preferably so adjusted that there is sufficient current generated to maintain the housing 10 and the brushes 8 and 9 in their normal position. This position, of course, will be determined by the balance between the magneto tractive effect of the generator and the tension on the spring 21. Should the load on the motor decrease, thus tending to increase the motor speed, the brush-control generator will generate more current and will therefore exert a greater tractive effort on the housing 10, and will rotate the brushes 8 and 9 to another position at which the speed of the motor will be reduced. On the other hand, should the load on the motor increase, thus tending to slow down the motor speed, the brush-control generator will exert less tractive effort on the housing 10, and therefore the brushes 8 and 9 will be rotated in the opposite direction to speed up the motor. The structure 10 may be made very light as compared with the motor, so as to provide negligible load on the motor, and at the same time enable it to be moved to various positions rapidly.

From the foregoing it will be obvious, therefore, that the device 26 may be calibrated directly in terms of the motor speed, and that when it is adjusted to any particular point that determines the speed at which the motor is to rotate and the brush-control generator thereafter automatically adjusts the motor speed to this fixed value.

The arrangements above described may be utilized with a slight modification to reverse the direction of rotation of the motor. In this case, instead of affixing the chain 19 at one end to the sprocket the chain merely surrounds the sprocket and has its opposite ends, which are adjustable, connected to two magnetically controlled members. Such an arrangement is illustrated in Figs. 5 and 6.

Figure 6:
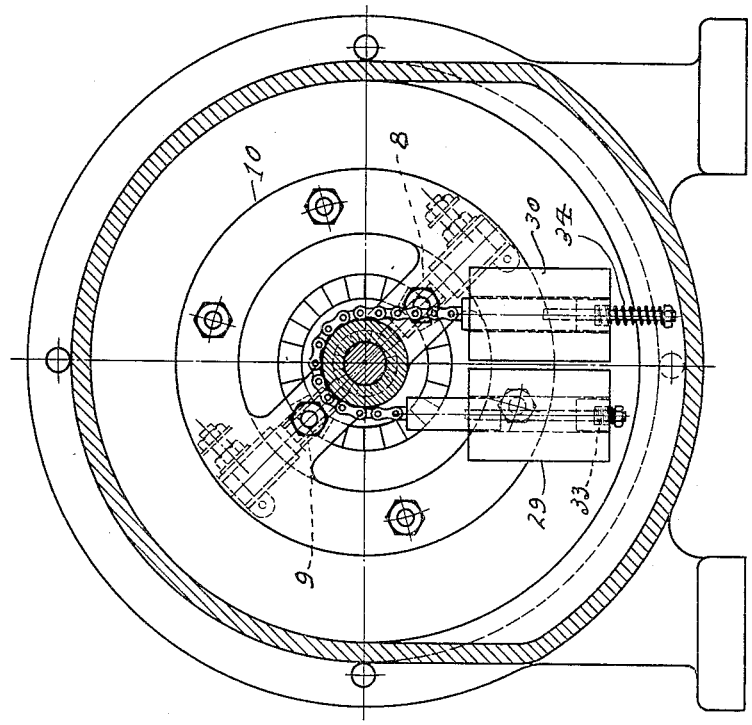
Fig. 6 is a sectional view of the arrangement of Fig. 5 with the brushes adjusted to a position wherein the motor rotates in a direction opposite to that of Fig. 5.
Figure 5:
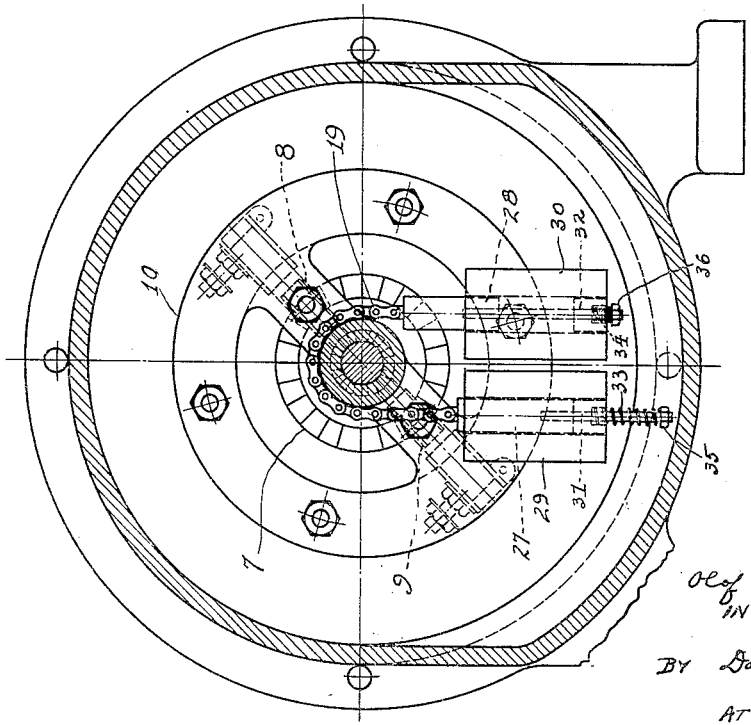
Fig. 5 is a sectional view of a modified manner of controlling the normal position of the motor brushes.

In Fig. 5 the brushes 8 and 9 are shown in a position wherein the motor rotates in one direction while brushes are shown in Fig. 6 as rotated through an angle of 90° to reverse the direction of rotation of the motor.

In the embodiment of Figs. 5 and 6 the chain 19 is attached at opposite ends to respective plungers 27 and 28, which form the cores of the solenoids 29 and 30. Attached to the plungers are respective rods 31 and 32. Surrounding the rods 31 and 32 are corresponding centering springs 33 and 34. The tension on these springs, and consequently the position of the brushes, may be adjusted by means of stop nuts 35 and 36. As shown in Fig. 5, the members 35 and 36 are so adjusted as to maintain the motor brushes in the position shown.

Obviously, therefore, when the motor is running the magneto tractive effort between the field frame 10 and its armature will compress the spring 33 and correspondingly relax the compression on the spring 34 until the brushes assume the predetermined position for the selected speed, as determined by the setting of the device 26 as above described. Obviously, therefore, solenoids 29 and 30 may be connected to a remote point at which they may be energized so as to maintain the plungers normally in the position shown in Fig. 5 to cause the motor to rotate in one direction. On the other hand, if it is desired to cause the motor to rotate in the opposite direction, the remote control button which may be of a reverse switch type energizing the opposite magnet to cause the plunger 27 to rise and the plunger 28 to be lowered to the position indicated in Fig. 6, under which condition the motor brushes are in the position to cause the motor to rotate in the opposite direction. Consequently the magneto tractive effort between the frame 10 and the generator armature will cause a corresponding compression of the spring 34 until the said spring balances the magneto tractive effort and retains the brushes in the desired position for the selected running speed. Any suitable switching arrangement may be provided at the remote point for controlling selective energization of the solenoids 29 and 30 to control the normal position of the brushes, depending upon which direction of motor rotation is desired.

While the above description relates primarily to direct current motors or single phase alternating current motors, it will be understood that the invention can equally well be applied to polyphase motors. Of course when it is desired to use the mechanism to reverse the direction of rotation of the polyphase motor, suitable switching arrangements are provided to be operated by the mechanism to reverse one of the phases, or in any other well known manner reverse the direction of rotation of the polyphase motor.

What is claimed is:

1. In combination a motor, a generator driven by said motor, means for varying the current from said generator independently of the motor, and means responsive to the current generated for moving the motor brushes to a predetermined point.

2. In combination a motor, a generator driven by said motor, means for controlling the magnitude of the current generated independently of the motor, the last mentioned means being directly calibrated in terms of motor speed, and means controlled by the current generated for maintaining the motor brushes at a point corresponding to the selected position of said control means.

3. In combination a motor, brushes for said motor, a generator armature attached to the motor shaft, the field structure of said generator being rotatable about said shaft, means uniting said brushes to said generator field structure, and means for varying the current from said generator to control the motor speed.

4. In combination a motor, a generator having its armature driven by the motor shaft, a field structure for said generator, said structure being united to the motor brushes, and means for varying the current generated by the said generator substantially independently of the motor speed.

5. In combination a series motor, brushes for said motor, a series generator, the field of said generator being rotatably mounted and united to the motor brushes to control the position of said brushes in accordance with a selected motor speed, and means for varying the current from said generator to control the position of the brushes corresponding to a selected speed of the motor.

6. In combination a series motor, brushes for said motor, means for moving said brushes to a point corresponding to the speed at which the motor is to run, the last mentioned means including a series generator coupled to the motor shaft, and means for controlling the magnitude of the current generated in accordance with the speed at which the motor is to run.

7. In combination a series motor, brushes for said motor, a generator driven by said motor for varying the position of said brushes corresponding to the speed at which the motor is to run, and means for varying the current from said generator to control the position of the brushes corresponding to a selected speed of the motor.

8. In combination, a series motor, brushes for said motor, a series generator having an armature and an adjustable stator, said stator being united to the motor brushes, and means for varying the magnitude of the current generated independently of the motor speed to control correspondingly the position of the motor brushes.

OLOF THOMPSON.